United States Patent [19]

Tsujio

[11] 4,209,332
[45] Jun. 24, 1980

[54] METHOD FOR MANUFACTURING PENCIL LEADS

[75] Inventor: Shinji Tsujio, Sakai, Japan

[73] Assignee: Sakura Color Products Corp., Osaka, Japan

[21] Appl. No.: 936,505

[22] Filed: Aug. 24, 1978

[51] Int. Cl.$^2$ ............................................. C09D 13/00
[52] U.S. Cl. ..................... 106/19; 106/271; 106/272; 260/13; 260/17.4 R; 260/17.4 ST; 260/29.6 H; 260/29.6 B; 260/18 N; 260/18 R
[58] Field of Search .................. 106/19, 271, 272; 260/17.4 R, 17.4 ST, 29.6 B, 13, 28.5 R, 29.6 H, 18 N, 18 R, 23 R, 23 H

[56] References Cited

U.S. PATENT DOCUMENTS

| | | | |
|---|---|---|---|
| 2,566,754 | 9/1951 | Van Dusen, Jr. et al. | 106/19 |
| 2,645,582 | 7/1953 | Loy | 106/19 |
| 2,682,476 | 6/1954 | Loy | 106/19 |

FOREIGN PATENT DOCUMENTS 51-21929  2/1976  Japan ............................................. 106/19

*Primary Examiner*—Allan Lieberman
*Attorney, Agent, or Firm*—Wenderoth, Lind & Ponack

[57] ABSTRACT

A method for manufacturing pencil leads which comprises thoroughly mixing 100 parts by weight of graphite, 30 to 60 parts by weight of a water-soluble nigrosine, an emulsion containing 10 to 30 parts by weight of wax, and water together, extruding the resultant base mixture from a die into rods of a desired diameter, drying the rods to remove the water contained therein, and then baking the rods at elevated temperatures. The base mixture may contain 10 to 30 parts by weight of a water-soluble organic nonelectrolyte of high molecular weight such as cellulose ethers and/or not more than 10 parts by weight of carbon black in relation to 100 parts by weight of graphite so as to further improve the quality of the leads obtained.

16 Claims, No Drawings

METHOD FOR MANUFACTURING PENCIL LEADS

The present invention relates to a method for manufacturing pencil leads.

Conventional pencil leads are produced by mixing graphite, carbon black, clay as a binder and water together, extruding the resultant mixture into rods, and then baking the rods at elevated temperatures of 800° to 1300° C. If desired, the leads obtained are impregnated with, for example, liquid paraffin, after baking. The pencil lead thus manufactured by the method, however, neither has a satisfactory bending strength and wear resistance nor runs smoothly on paper when penciling. In particular, the lead is not suitable for use as a refill lead for a mechanical pencil since a refill lead is required to possess both a small diameter and a sufficiently large bending strength.

Another method has been proposed for manufacturing pencil leads wherein an organic binder is used such as a natural resin, a synthetic resin or asphalt pitch, instead of clay. The pencil lead according to the method has an improved wear resistance, but has only insufficient bending strength and smoothness on writing. The method has a further disadvantage in that the extruded rods often weld or stick to each other during baking, thus lowering the yield of the leads. Another disadvantage involved in the method is that swellings and cracks are formed on leads during the baking operation. These swellings and cracks result in a significant fluctuation in the diameter of leads as well as less glossy surface of leads.

In order to obviate the disadvantages involved in the prior art, the inventor developed a new method for manufacturing pencil leads of a higher quality, as is disclosed in Japanese Patent Publication No. 51-41375 published Nov. 9, 1976. According to the method, graphite, nigrosine, water, and if desired carbon black are mixed together, and the resultant mixture is extruded from a die into rods. The rods are then baked at high temperatures of 800° to 1300° C. This method provides leads having a sufficient bending strength and wear resistance, but the lead writes somewhat less smoothly.

Therefore, the inventor developed a further improved method for manufacturing leads. In this method, as is disclosed in Japanese Patent Publication No. 51-48084 published Dec. 18, 1976, graphite, nigrosine, an aqueous solution of an organic nonelectrolyte of high molecular weight, and if desired carbon black together, are thoroughly mixed. The resultant mixture is then extruded from a die into rods, which are in turn baked at elevated temperatures of 800° to 1300° C., to provide leads having an improved penciling smoothness as well as a sufficient bending strength and wear resistance.

The above two improved methods developed by the inventor thus in general provide leads of a higher quality than the conventional leads containing clay as a binder. However, as in the case of the method using an organic binder such as a synthetic resin, the improved methods still have a disadvantage in that the extruded rods often stick or weld to each other, and swelling, and cracks are also produced on leads during the baking, resulting in the fluctuation of the diameter of leads obtained and less glossy surface of the leads.

A further disadvantage in the prior methods including the above methods by the inventor is that a baking with a high rate of elevating temperature, in particular, until the rods reach a temperature between about 400° C. and about 450° C., is liable to cause more swellings and cracks on leads, therefore more fluctuation in the lead diameter. Thus, a slow rate for elevating temperature is required for the baking. This lowers the productivity.

It is, therefore, an object of the invention to obviate the disadvantages involved in the prior art and to provide a method for manufacturing pencil leads in which neither swellings nor cracks are produced on leads in the baking operation.

It is another object of the invention to provide a method for manufacturing pencil leads in which there occurs no welding or sticking of extruded rods to each other during the baking operation.

It is also an object of the invention to provide a method for manufacturing pencil leads in a high yield which not only have a satisfactory bending strength and wear resistance but also write smoothly.

Other features and objects of the invention will be apparent from the following description and claims attached hereto.

A method for manufacturing pencil leads of the invention comprises thoroughly mixing 100 parts by weight of graphite, 30 to 60 parts by weight, preferably 35 to 45 parts by weight of a water-soluble nigrosine, an emulsion containing 10 to 30 parts by weight, preferably 15 to 20 parts by weight of wax, and water together, extruding the base mixture thus obtained into rod form, and baking the extruded rods at elevated temperatures.

Unless otherwise stated hereinafter, quantities are expressed as parts by weight in relation to 100 parts by weight of graphite.

A wide variety of water-soluble nigrosines can be used in the method of the invention. As such nigrosines are, for example, "Water Black R-510" and "Water Black R-445" sold by Orient Chemical Industries, Ltd., Japan under such trade names, "Nigrosine Z" sold by Sumitomo Chemical Co., Ltd., Japan under such trade name, C. I. Acid Black 2, and the like.

The base mixture containing more than 60 parts of the nigrosine provides an excessively hard lead. Thus, the lead scratches paper and does not run smoothly on paper when penciling. On the other hand, the base mixture containing less than 30 parts of the nigrosine provides a lead of an insufficient bending strength.

If desired, the base mixture further comprises 10 parts or less of carbon black as an ingredient. The use of more than 10 parts of carbon black should be avoided since an excess amount of the carbon black in the base mixture provides a lead which neither runs smoothly nor forms sufficiently black pencilings on paper.

Now the term "wax" as used herein includes not only wax in a strict sense which is chemically defined as esters of a higher fatty acid and a higher mono- or dihydric alcohol, but also wax in a broader sense, that is, any similar organic plastic substance which is solid or pasty at normal temperatures.

As is well-known, the chemically defined wax comprises mixtures of esters of higher fatty acids and higher aliphatic alcohols both having a wide range of carbons, and accordingly, the wax melts at a wide range of temperatures, that is, from about 30° C. to as high as about 90° C. In the method of the invention, any wax which will provide an emulsion having minute particles of the wax uniformly dispersed therein can be used. However, preferably the wax melting at temperatures ranging from about 45° C. to about 90° C. is used, and most preferably the wax melting at temperatures between about 45° C. and about 65° C.

Typical examples of such chemically defined wax used in the invention are animal wax such as bees wax and spermaceti, and vegetable wax such as rice bran wax, palm wax, carnauba wax and shellac wax.

Preferred examples of the wax in a broader sense are animal and vegetable fats such as hardened oil and Japan wax preferably melting at temperatures between about 45° C. and about 90° C. Other examples of the wax in a broader sense are higher fatty acids which are solid at normal temperatures having preferably 12 to 22 carbons and melting at about 45° C. to about 90° C., and derivatives thereof such as esters, alcohols, ketones, amides and the like. It is preferable that such derivatives also melt at temperatures from about 45° C. to about 90° C. Therefore, there can be used in the method of the invention, for example, fatty acids such as lauric acid, myristic acid, palmitic acid and stearic acid, esters such as phenyl palmitate and benzyl stearate, and ketones such as a palmitone and stearone. Stearic alcohol and palmitic alcohol can also be used. As amides, however, those of industrial grade such as stearic acid amide and palmitic acid amide are preferably used since they melt at temperatures around 90° C. or at lower temperatures.

Further examples of the wax in a broader sense in the invention are petroleum wax such as paraffin wax, petrolatum and microcrystalline wax which preferably melts at about 45° C. to about 90° C., more preferably at about 45° C. to about 65° C., and polyethylene of low molecular weight, preferably from about 1000 to 10000. Petroleum wax melting at a higher temperature than about 90° C. and polyethylene of a higher molecular weight than the above specified are not suitable for use in the method of the invention since such wax has a tendency to reduce the bending strength of leads obtained.

In the method of the invention, wax should be emulsified before being mixed with the other ingredients. An emulsion of the wax can be prepared in any conventional manner. For example, the wax is mixed with an emulsifying agent, preferably a nonionic surfactant having an HLB (Hydrophile-lipophile balance) larger than 10, and water thoroughly, thereby providing an emulsion of the wax. Some examples of the nonionic surfactants preferably used in the invention are polyoxyethylene nonylphenyl ether, polyoxyethylene sorbitan monolaurate, an alkylol amide surfactant sold by Sanyo Chemical Industry Co., Ltd., Japan under the trade name of "Profan 2012E" and the like.

Ten to thirty parts, preferably 15 to 20 parts of the wax is used in relation to 100 parts of graphite. The base mixture which contains more than 30 parts of the wax is extruded only with a great difficulty. Furthermore, such a base mixture provides leads of a small bending strength. On the contrary, the use of the base mixture containing less than 10 parts of the wax does not afford leads of a desired quality, in particular, a desired smoothness on writing.

Although the solid amount of the wax in the emulsion is not specifically limited in the method of the invention, it is preferable that the emulsion contains from about 20% by weight to about 40% by weight, more preferably from about 25% by weight to about 35% by weight, of the wax from the point of view of operations.

The use of the wax as it is or the use of a solution of the wax in an organic solvent should be avoided in the method of the invention, since when the wax is used in such manners as above, leads of a sufficient bending strength cannot be obtained. The efficiency of mixing the ingredients is also lowered when the wax alone or an organic solution thereof is mixed with the other ingredients.

According to the method of the invention, a water-soluble organic nonelectrolyte of high molecular weight can be used as a further ingredient in order to improve the quality of leads obtained. In a preferred operation, an aqueous solution of the nonelectrolyte is added to and mixed with the other ingredients to form the base mixture. Preferred water-soluble nonelectrolytes of high molecular weight used in the invention are cellulose ethers such as methyl cellulose, ethyl cellulose, hydroxyethyl cellulose, hydroxyethyl methyl cellulose, hydroxypropyl cellulose, methyl hydroxypropyl cellulose and ethyl hydroxyethyl cellulose; starch derivatives such as hydroxyethyl starch, dialdehyde starch and dextrin; and water-soluble synthetic resins such as polyvinylalcohol, polyacrylamide, polyvinylpyrrolidone, polyvinylmethylether and polyethyleneimide.

The amount of the nonelectrolyte in the base mixture is 10 to 30 parts, preferably 15 to 20 parts. When the base mixture contains more than 30 parts of the nonelectrolyte, the leads obtained therefrom are brittle.

The use of an aqueous solution of an electrolyte of high molecular weight such as sodium carboxymethyl cellulose and sodium alginate in place of the nonelectrolyte should be avoided in the method of the invention since under the presence of the electrolyte the nigrosine salts precipitate out from the mixture during the mixing operation. Thus, when baked, such a base mixture provides leads of a low quality having irregular surface.

According to the method of the invention, an emulsified wax is used in combination with the nigrosine in order to prepare the base mixture, and due to the use of the emulsified wax, the present method has distinctive advantages over the prior methods.

As is previously stated, the base mixture comprising graphite, nigrosine and water provides pencil leads having improved bending strength and wear resistance over the conventional leads containing clay as a binder, but writing somewhat less smoothly on paper. The present method has improved the smoothness on writing by the use of the emulsified wax together with nigrosine, as well as bending strength and wear resistance.

In turn, the base mixture comprising graphite, nigrosine, a nonelectrolyte and water provides leads of an improved smoothness on penciling. However, difficulties are encountered with in baking the above base mixture as is also previously mentioned. That is, the nonelectrolyte coupled with nigrosine is apt to produce swellings and cracks on leads and also causes the extruded rods to weld to each other in baking. The present method has successfully obviated the above difficulties in the baking by using an emulsified wax together with nigrosine in preparing the base mixture.

According to the present manufacturing method, there occur substantially no welding or sticking of the extruded rods to each other on baking even in the case of a higher rate of elevating temperature. This forms a remarkable contrast with the prior methods using a synthetic resin as a binder or a nonelectrolyte together with nigrosine as a binder.

Furthermore, according to the present method, substantially neither swellings nor cracks are generated on leads when the base mixture is baked, as clearly shown in the Examples which will be later described. Therefore, the fluctuation in the diameter of leads is greatly reduced, as is exemplified by the small deviation of the diameter of leads in the Examples later described. This is also in remarkable contrast with the prior methods. The lead obtained according to the present method has naturally smooth and glossy surface.

As will be clear from the above, the present method permits the production of pencil leads of a higher quality in a higher yield.

A second and important advantage is that the lead obtained according to the method of the invention has a more improved bending strength, wear resistance and smoothness on writing.

The nigrosine serves as a binder for binding graphite particles together. When the base mixture contains carbon black as an ingredient, the nigrosine binds carbon black particles together, and graphite and carbon black particles together as well as graphite particles together. On the other hand, the wax and/or the nonelectrolyte are decomposed when baked, and provide an appropriate number of minute openings or vacant voids in the leads uniformly dispersed therein. It is likely that the vacant openings of an appropriate size uniformly dispersed in the leads result in an improved writing quality. Thus, the binding due to the nigrosine in cooperation with the presence of the uniformly dispersed minute openings in the leads provides the leads with a satisfactory smoothness on writing as well as a sufficient bending strength and wear resistance. The amount of the wax in relation to graphite is specified in the invention in view of the above. The amount of the nonelectrolyte is similarly specified.

It is to be noted here that the base mixture containing both of the wax and the nonelectrolyte in the specified amounts, respectively, provides pencil leads of further improved quality. The lead obtained therefrom has a smaller coefficient of friction so that the lead runs very smoothly on paper, but also a larger bending strength. The lead is thus suitably used, for example, for a refill for a mechanical pencil.

The wax which melts at temperatures higher than the previously specified is not used in the method of the invention since it is apt to produce openings of a larger size in the leads, thereby lowering the bending strength of the leads. This applies also to polyethylene of higher molecular weight than the previously specified. The use of the wax beyond the specified amount provides also excessively many number of openings in the leads, thus lowering the bending strength of the leads. Similarly, the amount of the nonelectrolyte is limited in the method.

When the wax is used alone in place of the emulsified wax, the wax will not be dispersed uniformly in the base mixture in the form of minute particles, thereby producing openings of a larger size. When the wax is used in the form of an organic solution, the leads obtained have neither a satisfactory smoothness on writing nor a sufficient bending strength nor a sufficient wear resistance possibly due to lack of uniformity of the dispersion of the ingredients in the base mixture.

In the prior art using clay as a binder, the hardness or the blackness of leads is adjusted by varying the content of the clay in the base mixture. Therefore, the conventional lead of higher degree of blackness has inevitably a small bending strength, whereas the lead of lower degree of blackness has an excessive hardness due to a large content of the clay in the base mixture. However, according to the method of the invention, the blackness and the hardness are adjusted substantially independently from each other by varying the content of the wax, or the total content of the wax and the nonelectrolyte in the base mixture.

The above is a third advantage of the invention. As is previously mentioned, the wax and also the nonelectrolyte produce a number of vacant space or openings in the leads when baked, and the blackness of the leads obtained depends upon the concentration of the openings or space ratio in the leads. The hardness of the leads, on the contrary, depends upon the binding through the nigrosine. Therefore, the present method permits the manufacture of pencil leads of a desired blackness substantially without regard to consideration of their hardness.

In manufacturing pencil leads according to the method of the invention, the ingredients, namely, graphite, nigrosine, emulsified wax, water, and if desired, together with an aqueous solution of the nonelectrolyte and/or carbon black, are thoroughly mixed, and the resultant base mixture is extruded from a die into rods of a desired diameter, dried, and then baked in an oven at elevated temperatures. The operations of mixing, extruding, drying and baking can be performed by any conventional method which has been adopted in the field of the art. The order in which the each ingredient is mixed with the other ingredients is not specifically limited.

In a typical operation, an emulsion of the wax, nigrosine, graphite, water, and if desired, an aqueous solution of the nonelectrolyte and/or carbon black, are mixed together, and then rolled by the use of a three-roll mill, thereby providing the base mixture. Usually, the base mixture is adapted so as to contain about 200 to about 400 parts of water therein and so as to have a viscosity suitable for the mixing or the rolling. When an aqueous solution of the nonelectrolyte is used as an ingredient, the concentration of the aqueous solution is usually so adapted that the resultant base mixture contains about 200 to about 400 parts of water in totality.

The extruded rods are dried to remove water contained therein at temperatures ranging from a normal temperature to an elevated temperature at which the ingredients will not decompose, usually below 180° C., preferably at temperatures between about 60° C. and 105° C.

The dried rods are then baked at higher temperatures into pencil leads. As an example, the rods are at first gradually heated to about 400° C. to about 450° C. in 3 to 5 hours. The rate of elevating temperature at this stage is about 60° to 100° C. per hour. The rods are then rapidly heated to about 1000° to 2000° C. in 1.5 to 2 hours, and further heated at the temperature for another two to four hours.

Now the present invention will be illustrated in the following examples. However, these examples are intended to illustrate the invention and are not to be construed to limit the scope of the invention.

In the following examples, the base mixture was prepared as follows. Ninety percent by weight of the molten wax was mixed with 10% by weight of polyoxyethylene sorbitan monolaurate, a nonionic surfactant sold by Kao Soap Co., Ltd., Japan under the trade name of "Emasol 1130." The thus obtained mixture, while further stirred using a high-speed rotary disperser, was added to hot water so that the resultant emulsion contained 30% by weight of the wax. The emulsion was then mixed with an aqueous mixture of flake graphite and the water-soluble nigrosine together with or without carbon black and/or an aqueous solution of the water-soluble nonelectrolyte, and was then rolled together by the use of a three-roll mill, thereby providing the base mixture.

EXAMPLE 1

A base mixture having the following composition was extruded from a die into rods of 0.7 mm in diameter. After being dried at a normal temperature, the rods were at first gradually heated to about 400° C. in about 5 hours, and then rapidly heated to about 1050° C. in about 2 hours, in a baking oven. The rods were heated at the temperature for further two hours, and then allowed to stand for cooling, thus providing Sample A leads.

In the following examples, the parenthetical values are calculated on parts per 100 parts of graphite.

|  | Composition | Amounts |
| --- | --- | --- |
| Sample A: | Graphite | 50 (100) |
|  | "Water Black R-510" | 30 (60) |
|  | Emulsion of Japan wax | 30 (60) |
|  | Water | 250 (500) |

Further Samples of leads, Samples B to J were manufactured in the same manner as in the above from the base mixtures having the following compositions.

|  | Composition | Amounts |
| --- | --- | --- |
| Sample B: | Graphite | 65 (100) |
|  | "Water Black R-510" | 25 (39) |
|  | Emulsion of bees wax | 30 (46) |
|  | Water | 250 (385) |
| Sample C: | Graphite | 55 (100) |
|  | "Water Black R-510" | 30 (55) |
|  | Emulsion of bees wax | 50 (91) |
|  | Water | 250 (455) |
| Sample D: | Graphite | 63 (100) |
|  | Carbon black | 5 (8) |
|  | "Water Black R-510" | 22 (35) |
|  | Emulsion of stearic acid | 30 (48) |
|  | Water | 250 (397) |
| Sample E: | Graphite | 65 (100) |
|  | "Water Black R-510" | 25 (39) |
|  | Emulsion of benzyl stearate | 30 (46) |
|  | Water | 250 (385) |
| Sample F: | Graphite | 58 (100) |
|  | "Water Black R-510" | 22 (38) |
|  | Emulsion of paraffin wax[*1] | 30 (52) |
|  | Hydroxyethyl cellulose | 10 (17) |
|  | Water | 250 (431) |
| Sample G: | Graphite | 55 (100) |
|  | Carbon black | 5 (9) |
|  | "Water Black R-510" | 20 (36) |
|  | Emulsion of polyethylene of average molecular weight of about 7000 | 30 (55) |
|  | Polyvinylalcohol[*2] | 10 (18) |
|  | Water | 250 (455) |
| Sample H: | Graphite | 55 (100) |
|  | "Water Black R-510" | 25 (46) |
|  | Emulsion of polyethylene of average molecular weight of about 7000 | 47 (86) |
|  | "Poval 205" | 6 (11) |
|  | Water | 250 (455) |
| Sample I: | Graphite | 58 (100) |
|  | "Water Black R-510" | 22 (38) |
|  | Emulsion of rice bran wax | 30 (52) |
|  | Dextrin | 10 (17) |
|  | Water | 250 (431) |

-continued

|  | Composition | Amounts |
| --- | --- | --- |
| Sample J: | Graphite | 55 (100) |
|  | "Water Black R-510" | 24 (44) |
|  | Emulsion of polyethylene of average molecular weight of about 7000 | 20 (36) |
|  | Hydroxyethyl cellulose | 15 (27) |
|  | Water | 350 (637) |

[*1] sold by Nippon Oil Co., Ltd., Japan under the trade name of "135° Paraffin"
[*2] sold by Kuraray Co., Ltd., Japan under the trade name of "Poval 205"

All the above Sample leads A to J according to the present method had an excellent quality: a satisfactory smoothness on writing, a sufficient bending strength and wear resistance, as shown in the Table which will appear hereinlater.

In baking, the rods did not weld to each other. Furthermore, neither swellings nor cracks were produced on the leads during the baking operation, also as shown in the Table. Thus, the leads had 200 magnification-microscopically smooth surface and no remarkable irregularities thereon.

The Samples F to J illustrate that the base mixture containing the nonelectrolyte in general provides leads which have smaller coefficients of friction, thereby permitting more smooth writing on paper, and a larger bending strength.

EXAMPLE 2

The same base mixture as Sample A was extruded into rods of 0.7 mm in diameter. After being dried at a normal temperature, the rods were at first gradually heated to about 400° C. in about 3 hours, and then rapidly heated to about 1050° C. in 1.5 hours. After the rods were further heated at the temperature for about another two hours, the rods were allowed to stand for about 3 hours for cooling, thus providing Sample K leads.

Just in the same manner as above except the use of the base mixture same as Sample F, leads of Sample L were manufactured.

In this example, the rods were heated at a higher rate of elevating temperature in baking than in Example 1, but no welding of the rods to each other occurred. Moreover, neither swellings nor crackings were produced on leads. It will be also clear from the Table that the leads thus obtained still have a satisfactory quality.

CONTROLS

Sample leads M and N were manufactured from the base mixtures having the following compositions, respectively, for the purpose of comparison with the leads according to the invention.

|  | Composition | Amounts |
| --- | --- | --- |
| Sample M: | Graphite | 58 (100) |
|  | "Water Black R-510" | 22 (38) |
|  | Hydroxyethyl cellulose | 20 (34) |
|  | Water | 250 (431) |
| Sample N: | Graphite | 65 (100) |
|  | "Water Black R-510" | 25 (39) |
|  | Water | 250 (385) |

Each of the mixtures was extruded into rods of 7 mm in diameter. After being dried at a normal temperature, the rods were gradually heated to about 400° C. in about 5 hours, and were then heated rapidly to about 1050° C. in about 2 hours. The rods were further heated at the temperature for about another two hours, and then allowed to stand for about 3 hours for cooling.

The properties of the leads thus obtained are shown in the Table. As apparent, the Sample M leads had many swellings and cracks as well as irregularities thereon, thereby resulting in a larger standard deviation of the lead diameters, whereas the leads had the bending strength and wear resistance comparable to those of the leads according to the invention. The Sample N leads had a smaller number of swellings and cracks thereon than the Sample M leads, but had a larger coefficient of friction, thereby resulting in a less smooth writing on paper.

Furthermore, during heating the rods at a lower rate of elevating temperature in the baking, some of the rods welded to each other both in the cases of Samples M and N.

The properties of a conventionally marketed HB pencil lead, Sample O, using clay as a binder, are also shown in the Table. The lead had irregular surface and only an insufficient bending strength. The lead writes less smoothly, and the pencilings by the lead have a powder remaining.

In evaluating the properties of the above Sample leads, bending strengths were determined according to JIS (Japanese Industrial Standard) S-6019. In more detail, the bending strength of lead was determined by placing the lead on supports spaced 30 mm apart and applying a load on the midpoint of the span of the lead until the lead is broken. The bending strength S (g/mm$^2$) was thus calculated from the following formula:

$$S = 8PL/D^3$$

where
P is the load (g);
L is the distance between the supports (mm); and
D is the diameter of the lead (mm).

Coefficients of friction were determined also in accordance with JIS S-6019, that is, by rotating the lead with one end thereof under contact with a polished surface of electrolytic copper while a load of 400 g is axially applied to the lead. The coefficient of friction M was calculated from the following formula:

$$M = F/P$$

where
F is dynamical friction force (g); and
P is the load (g).

TABLE

| Samples | Surface observations[3] | Number of swellings per 100 leads | Cracks | Standard deviations of lead diameters | Blackness | Bending strengths (g/mm$^2$) | Coefficients of friction |
|---|---|---|---|---|---|---|---|
| A | good | none | none | 0.0018 | HB-H | 22000 | 0.22 |
| B | good | none | none | 0.0021 | HB-H | 21900 | 0.21 |
| C | good | none | none | 0.0015 | H | 21000 | 0.22 |
| D | good | none | none | 0.0020 | HB-H | 20900 | 0.22 |
| E | good | none | none | 0.0022 | HB | 20800 | 0.21 |
| F | good | none | none | 0.0031 | HB | 23500 | 0.18 |
| G | good | none | none | 0.0025 | HB | 24100 | 0.19 |
| H | good | none | none | 0.0028 | HB | 21300 | 0.19 |
| I | good | none | none | 0.0033 | HB | 23200 | 0.19 |
| J | good | none | none | 0.0057 | H | 25800 | 0.19 |
| K | good | none | none | 0.0069 | HB-H | 21900 | 0.22 |
| L | good | none | none | 0.0097 | HB | 23300 | 0.18 |
| M | bad | 980 | some | 0.0982 | HB | 20500 | 0.20 |
| N | slightly bad | 20 | some | 0.0079 | H | 21300 | 0.28 |
| O | bad | *4) | *4) | *4) | HB | 8200 | 0.22 |

[3] Irregularity or unevenness of the surface of the leads was examined by the use of a 200 magnification-microscope.
*4) Not examined.

What is claimed is:

1. A method for manufacturing pencil leads which comprises:
   mixing 100 parts by weight of graphite, 30 to 60 parts by weight of water-soluble nigrosine, an aqueous emulsion which contains 10 to 30 parts by weight of wax;
   said wax melting at a temperature between about 45° C. and about 90° C. and being selected from the group consisting of
   a. esters of higher fatty acids and higher aliphatic alcohols,
   b. petroleum wax,
   c. animal fats,
   d. vegetable fats,
   e. fatty acids of 2 to 12 carbon atoms,
   f. esters of fatty acids having 12 to 22 carbon atoms and a hydroxyl compound selected from the group consisting of phenols and aromatic alcohols,
   g. higher alkyl ketones selected from the group consisting of palmitone and stearone,
   h. amides selected from the group consisting of industrial grade palmitic acid amide and stearic acid amide,
   i. polyethylene having a molecular weight of about 1000 to 10000;
   and sufficient water to permit the mixture to be extruded;
   extruding the resultant base mixture from a die into rods;
   drying the extruded rods to remove the water contained therein; and
   baking the dried rods at elevated temperatures to form pencil leads.

2. A method for manufacturing pencil leads as claimed in claim 1 wherein there is further added to the base mixture 10 to 30 parts by weight of a water-soluble nonelectrolyte of high molecular weight in relation to 100 parts by weight of graphite.

3. A method for manufacturing pencil leads as claimed in claim 1 wherein there is further added to the base mixture not more than 10 parts by weight of carbon black in relation to 100 parts by weight of graphite.

4. A method for manufacturing pencil leads as claimed in claim 2 wherein there is further added to the base mixture not more than 10 parts by weight of carbon black in relation to 100 parts by weight of graphite.

5. A method for manufacturing pencil leads as claimed in claim 1 wherein the wax is selected from the group consisting of esters of higher fatty acids and higher aliphatic alcohols.

6. A method for manufacturing pencil leads as claimed in claim 1 wherein the wax is petroleum wax.

7. A method for manufacturing pencil leads as claimed in claim 1 wherein the wax is animal fat.

8. A method for manufacturing pencil leads as claimed in claim 1 wherein the wax is a vegetable fat.

9. A method for manufacturing pencil leads as claimed in claim 1 wherein the wax is a fatty acid of 12 to 22 carbons.

10. A method for manufacturing pencil leads as claimed in claim 1 wherein the wax is an ester of a fatty acid having 12 to 22 carbons and a hydroxyl compound selected from the group consisting of phenols and aromatic alcohols.

11. A method for manufacturing pencil leads as claimed in claim 1 wherein the wax is a higher alkyl ketone selected from the group consisting of palmitone and stearone.

12. A method for manufacturing pencil leads as claimed in claim 1 wherein the wax is an amide selected from the group consisting of industrial grade palmitic acid amide and stearic acid amide.

13. A method for manufacturing pencil leads as claimed in claim 1 wherein the wax is polyethylene having molecular weight of about 1000 to 10000, 14. A method for manufacturing pencil leads as claimed in claim 2 wherein the water-soluble nonelectrolyte of high molecular weight is a member selected from the group consisting of cellulose ethers, starch derivatives and water-soluble synthetic resins.

15. A method for manufacturing pencil leads as claimed in claim 14 wherein the starch derivative is a member selected from the group consisting of hydroxyethyl starch, dialdehyde starch and dextrin.

16. A method for manufacturing pencil leads as claimed in claim 14 wherein the water-soluble synthetic resin is a member selected from the group consisting of polyvinylalcohol, polyacrylamide, polyvinylpyrrolidone, polyvinylmethylether and polyethyleneimide.

* * * * *